(12) United States Patent
Schiestle et al.

(10) Patent No.: US 6,343,172 B1
(45) Date of Patent: Jan. 29, 2002

(54) COMPOSITE FIBER OPTIC/COAXIAL ELECTRICAL CABLES

(75) Inventors: Joseph E. Schiestle, Winston-Salem; Herbert V. Congdon, II, Conover, both of NC (US)

(73) Assignee: Corning Cable System LLC, Hickory, NC (US)

( * ) Notice: Subject to any disclaimer, the term of this patent is extended or adjusted under 35 U.S.C. 154(b) by 0 days.

(21) Appl. No.: 09/382,007

(22) Filed: Aug. 24, 1999

(51) Int. Cl.[7] .................................................. G02B 6/44
(52) U.S. Cl. ........................................ 385/101; 385/112
(58) Field of Search ................................ 385/101, 102, 385/103, 106, 109, 111, 112, 113

(56) References Cited

U.S. PATENT DOCUMENTS

| | | | |
|---|---|---|---|
| 4,009,932 A | 3/1977 | Ferrentino | 350/96 B |
| 4,118,594 A | 10/1978 | Arnaud | 350/96.23 |
| 4,156,104 A | 5/1979 | Mondello | 174/70 R |
| 4,158,478 A | * 6/1979 | D'Auria et al. | 350/96.23 |
| 4,695,127 A | 9/1987 | Ohlhaber et al. | 350/96.23 |
| 4,867,527 A | 9/1989 | Dotti et al. | 350/96.23 |
| 4,896,939 A | 1/1990 | O'Brien | 350/96.23 |
| 5,150,442 A | 9/1992 | Desmons | 385/101 |
| 5,371,823 A | 12/1994 | Barrett et al. | 385/101 |
| 5,468,913 A | 11/1995 | Seaman et al. | 174/102 R |
| 5,555,336 A | 9/1996 | Winslow | 385/101 |
| 5,604,833 A | 2/1997 | Kambe et al. | 385/104 |
| 5,745,627 A | 4/1998 | Arroyo et al. | 385/101 |
| 5,777,260 A | 7/1998 | Klumps et al. | 174/24 |
| 5,960,144 A | * 9/1999 | Klumps et al. | 385/113 |

FOREIGN PATENT DOCUMENTS

| | | | |
|---|---|---|---|
| DE | 195 25 424 A1 | 1/1997 | G02B/6/44 |
| JP | 9-213136 | 8/1997 | H01B/7/00 |
| JP | 9-306254 | 11/1997 | H01B/11/22 |

OTHER PUBLICATIONS

Derwent Abstract; JP09213136–A; Aug. 15, 1997.
Derwent Abstract; JP09306254–A; Nov. 28, 1997.
Communication System Engineering Handbook; 1967; pp. 21–28.

* cited by examiner

Primary Examiner—Frank G. Font
Assistant Examiner—Michael P. Stafira
(74) Attorney, Agent, or Firm—Timothy J. Aberle

(57) ABSTRACT

Composite cables operative to transmit information in electrical and/or optical transmission modes. The cables can include an electrical coaxial conductor comprising a generally central electrical conductor in a dielectric matrix. At least one optical transmission component is integrated with the matrix. The matrix can include at least two optical transmission components disposed on generally opposed sides of the central electrical conductor. Any optical transmission component can be substantially mechanically de-coupled from the matrix. In addition, the matrix can include at least one ripcord, and an indicia can be formed on the matrix for locating the position of an optical transmission component. The composite cables can include structural features for imparting a preferential bend to the cable.

17 Claims, 2 Drawing Sheets

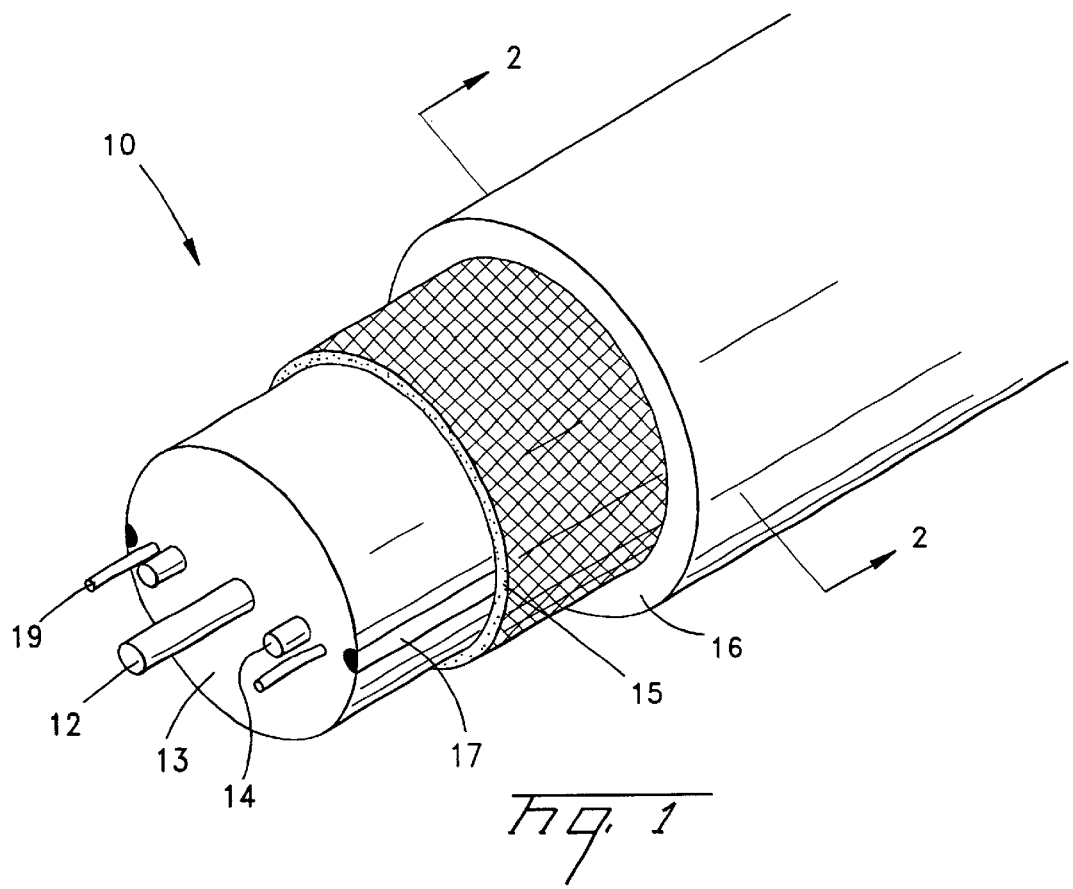
Fig. 1
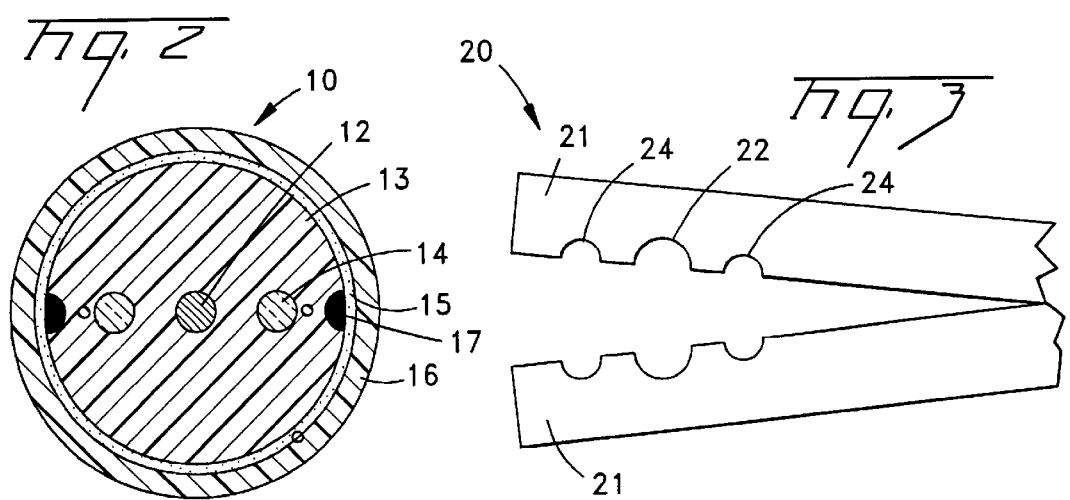
Fig. 2
Fig. 3

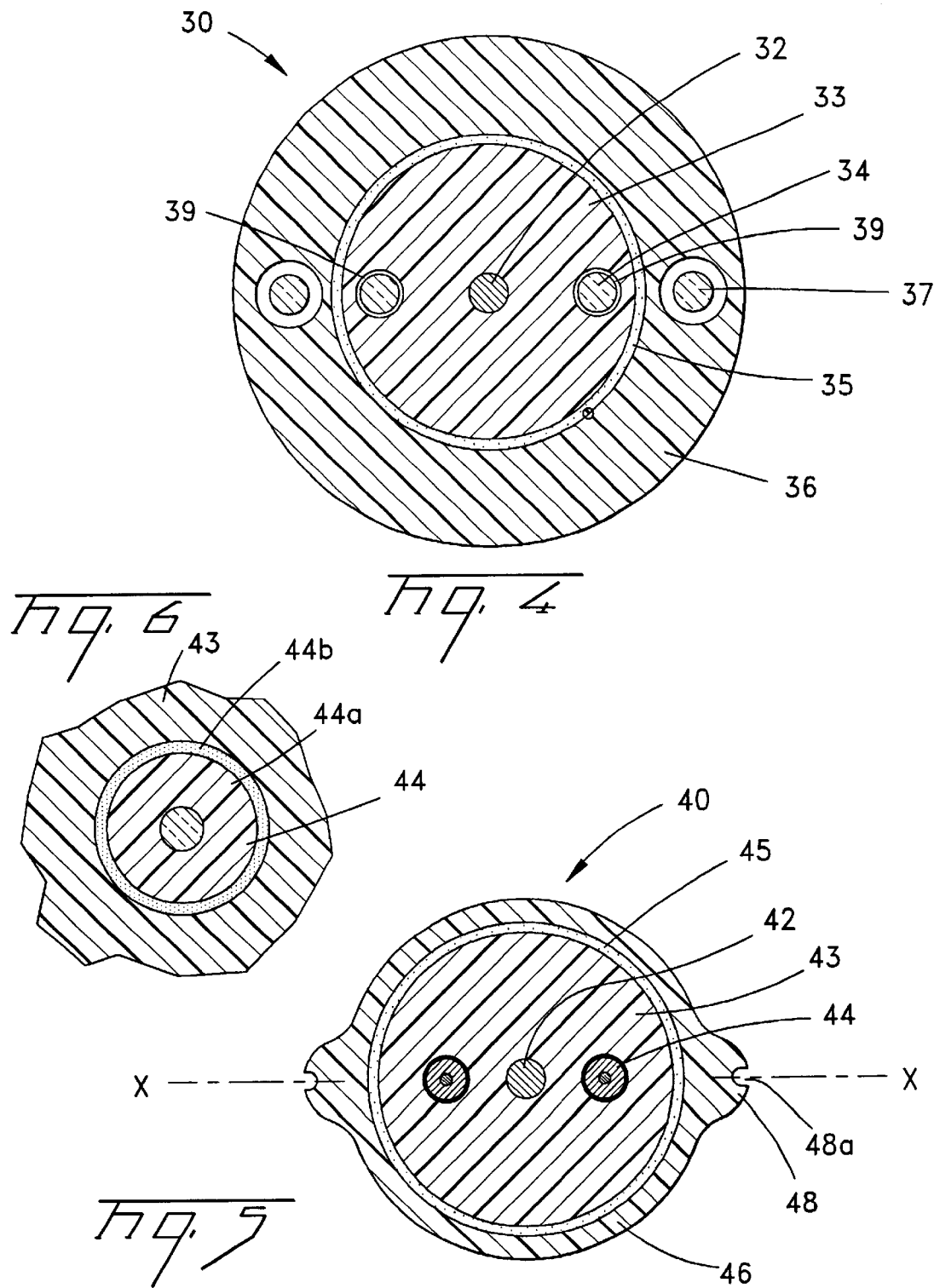

COMPOSITE FIBER OPTIC/COAXIAL ELECTRICAL CABLES

FIELD OF INVENTION

The present invention relates to composite cables that include at least one optical transmission component and at least one coaxial electrical transmission component.

BACKGROUND OF THE INVENTION

Fiber optic cables include at least one optical fiber that can transmit data, computer, and telecommunication information. Composite cable designs combine the high bit-rate capacity of at least one optical fiber with the electrical transmission carrying capacity of at least one electrical conductor. Conventional composite cable designs, however, can have unacceptable optical/electrical performance characteristics, can require undesirable structural features that make optical fiber access difficult, can be difficult to route through cable passageways, and/or can make the cable expensive to produce.

For certain applications, a slotted core cable can be difficult to route through cable passageways and/or too expensive. For example, U.S. Pat. No. 5,777,260, incorporated by reference herein, discloses a coaxial cable having an optical ribbon disposed in a groove of a slotted core formed on the inner conductor of the coaxial cable. The groove proceeds helically with respect to the cable axis, and an outside envelope surrounds the slotted core.

Conventional composite cables can include electrical conductors that are sized for power, rather than data, transmission. For example, U.S. Pat. No. 4,867,527, incorporated by reference herein, discloses a combined electrical power and optical fiber cable. The cable requires a large electrical conductor with insulation therearound, a sheath around the insulation, a one or two-part protective layer around the insulation, a tube within the protective layer, and at least one optical fiber loosely received in the tube. The protective layer can have armoring therearound and, in this case, the radial thickness of the protective layer is from two to four times the diameter of the tube.

A relatively large and expensive conventional composite cable has been designed for undersea applications. U.S. Pat. No. 5,468,913, incorporated by reference herein, discloses an electro-optical marine tow cable requiring a relatively large bundle of coaxial core conductors positioned at the neutral axis of the cable with the coaxial shield conductor circumscribing a dielectric material. The dielectric material includes fiber optic transmitters helically circumscribing the core conductors. Surrounding the electro-optical assembly is a watertight jacket and a protective armor cover for carrying the tensile forces imparted to the cable during marine towing operations.

A composite cable can include cable components that make optical fiber access difficult. For example, U.S. Pat. No. 5,555,336, incorporated by reference herein, discloses a fiber optic power distribution cable including an optical fiber center, a first conductive layer coated around the optical fiber, an elongated glass capillary surrounding the optical fiber and a second conductive layer coated around the elongated glass capillary. As an additional example, U.S. Pat. No. 4,896,939, incorporated by reference herein, discloses a hybrid fiber optic/electrical cable and connector assembly. The cable includes a central optical fiber, a first tubular electrical conductor enclosing the optical fiber, a second tubular electrical conductor enclosing the first electrical conductor, and a dielectric support element disposed between the conductors for maintaining the conductors in a coaxial relationship.

OBJECTS OF THE INVENTION

It is an object of the present invention to provide a compact composite cable that is operative to transmit information in electrical and/or optical transmission modes, the cable preferably including an electrical coaxial conductor comprising an electrical conductor separated from a generally annular electrical conductor by a dielectric matrix, and at least one optical transmission component generally surrounded by the matrix.

It is an object of the present invention to provide a compact composite cable that is operative to transmit information in electrical and/or optical transmission modes, the cable preferably including an electrical conductor separated from a generally annular electrical conductor by a dielectric matrix; and at least one optical transmission component disposed in the matrix, the cable comprising stiffening members imparting a preferential bend characteristic and neutral axis thereto, the at least one optical fiber being generally aligned with the neutral axis.

BRIEF DESCRIPTION OF THE DRAWING FIGURES

The invention is described with reference to the accompanying drawing Figures. To conserve space on the appended drawing sheets, the word "Figure" is abbreviated.

FIG. 1 is an isometric view of a fiber optic cable according to the present invention.

FIG. 2 is a cross sectional view of the fiber optic cable of FIG. 1 taken at line 2—2.

FIG. 3 is a schematic view of a portion of a stripping tool for use with the fiber optic cables of the present invention.

FIG. 4 is a cross sectional view of a fiber optic cable according to the present invention.

FIG. 5 is a cross sectional view of a fiber optic cable according to the present invention.

FIG. 6 is an enlarged, partial cross sectional view of the cable of FIG. 5.

DETAILED DESCRIPTION OF THE INVENTION

Composite cables according to the present invention are compact and combine the high-bit rate capacity of at least one optical fiber with the high bandwidth of at least one coaxial electrical conductor. Referring to FIGS. 1–2, an exemplary composite cable 10 according to the present invention will be described. In a preferred embodiment, composite cable 10 comprises a central electrical conductor 12 and at least one, but preferably at least two, optical transmission components 14 that are associated with a dielectric matrix 13. In a preferred embodiment, optical transmission components 14 are generally surrounded by a dielectric matrix 13. Dielectric matrix 13 is preferably surrounded by an electrical conductor 15 that is, in turn, surrounded by a cable jacket 16 preferably formed of a polyethylene material.

Composite cables according to the present invention can be practiced in the form of a cable 30 having a jacket with at least one optical transmission component therein (FIG. 4). In a preferred embodiment, composite cable 30 comprises a central electrical conductor 32 and optical transmission components 34 preferably surrounded by a dielectric matrix 33. Dielectric matrix 33 is preferably surrounded by an electrical conductor 35 that is surrounded by a cable jacket 36. Cable jacket 36 preferably is formed of a polyethylene material and includes at least one optical transmission component 37.

The present invention can be practiced in the form of a composite cable 40 having a preferential bend characteristic (FIG. 5). In a preferred embodiment, composite cable 40 comprises a central electrical conductor 42 and optical transmission components 44 (FIGS. 5–6) surrounded by a dielectric matrix 43. Dielectric matrix 43 is preferably surrounded by an electrical conductor 45 that is surrounded by a cable jacket 46. To impart a preferential bend characteristic to cable 40, cable jacket 46 preferably includes at least two opposed, stiffening members, for example, extensions 48. At least one of extensions 48, but preferably both, have respective openings, for example, slits 48a, formed therein for ease of jacket removal. Alternatively, other exemplary stiffening members suitable for use with composite cable 40 include at least one strength member, for example, aramid yarn, fiber or glass reinforced rods, and/or metallic wires.

Fiber optic cables according to the present invention are operative to transmit, for example, data, computer, and telecommunication information in optical and/or electrical transmission modes. For example, taken together, electrical coaxial conductors 12;15, 32;35, and 42;45, and respective dielectric matrices 13,33,43, define respective electrical coaxial cable components for high bandwidth transmission. For compactness, optical transmission components 14,34,44 are integrated into the electrical coaxial components, and are operative to provide a high bit-rate capacity for optical transmission requirements. In the preferred embodiment, integration of optical transmission component 14,34,44 means that it is generally firmly held by, but not necessarily rigidly affixed to, a respective dielectric matrix 13,33,43.

In the preferred embodiment, an optical transmission component 14,34,37,44 comprises a single mode glass optical fiber having an outside diameter of about 250–300 μm. However, multi-mode or multi-core glass or plastic optical fibers can be used as well. Alternatively, any optical transmission component can comprise a multi-optical fiber component, for example, a 2-fiber cable subunit or a 2-fiber optical ribbon. In the preferred embodiment, optical transmission components 14,34,44 are generally surrounded by respective dielectric matrices 13,33,43.

Optical transmission components 14,34,44 are preferably tightly or loosely coupled to respective dielectric matrices 13,33,43. Any of the optical transmission components can be loosely coupled to a respective matrix by, for example, an unfilled passageway 39 formed in the matrix that surrounds but loosely receives the optical transmission component therein (FIG. 4). Alternatively, the passageway can include at least one buffering component 44b (FIG. 6) that defines a buffering zone, substantially de-coupling the matrix from the optical transmission component. Buffering component 44b can include, for example: a viscous slip layer, e.g., a gel, oil, or grease; a non-viscous or substantially non-viscous slip layer, e.g., a TEFLON coating; a protective buffer tube; and/or at least one strength member, e.g., fiberglass or aramid fibers. On the other hand, for a generally tight coupling of the component to the matrix, the optical transmission component can be adhered or bonded to matrix 13 directly or with a controlled bond layer therebetween. For example, the controlled bond layer can include an interfacial layer of a relatively low modulus plastic or epoxy resin for permitting stripping of the matrix therefrom. As a further illustration, the optical transmission component may comprise a plastic tight buffer layer 44a about an optical fiber (FIG. 6) that is adhered or bonded to the matrix, for example, a buffer layer of about 500–900 μm OD. Tight buffer layer 44a can be generally the same OD as conductor 12. Alternatively, tight buffer layer 44a can be generally surrounded by buffering component 44b. In addition, matrix 13 can include at least one ripcord 19 (FIGS. 1–2) adjacent to or touching the optical transmission component for ease of access thereto.

For good electrical performance, conductors 15,35,45 are preferably formed of a conductive metallic foil, mesh, or braid. Alternatively, conductors 15,35,45 can be a laminated component as disclosed in U.S. Pat. No. 5,521,331, incorporated by reference herein, comprising a first shielding member formed of an elongated ribbon of insulating material and a pair of elongated metal foil strips bonded to the opposite sides of the ribbon forming two concentric substantially closed shielded layers. Dielectric matrices 13,33, 43 can be formed of any suitable plastic resin, for example, an inherently flame retardant material, e.g., PVC, that can include any suitable flame-retardant additives, e.g., metal hydroxides. The plastic resin can include any suitable inert fillers, and it may be foamed, for example, by conventional chemical or mechanical means during extrusion of the matrix. Matrices 13,33,43 can include at least one indicia for tracing the longitudinal or helical position of optical transmission components therein. For example, the indicia can comprise an indentation, a contrasting sprayed ink line, and/or co-extruded stripes 17 (FIGS. 1–2).

Fiber optic cables according to the present invention can exhibit preferential bending during installation. For example, fiber optic cable 40 (FIG. 5) includes extensions 48 defining a neutral axis X—X. Preferably, at least one optical transmission component 44 is generally aligned with neutral axis X—X for maintaining low bend-induced changes in optical attenuation.

Manufacture

Manufacture of cables according to the present invention can be accomplished by feeding at least one optical transmission component and at least one electrical conductor into an extruder and extruding matrix 13 therearound. During extrusion, the at least one optical transmission component 14,34,37,44 can be disposed longitudinally or helically relative to the center of the cable and integrated into the matrix or jacket. Electrical conductors 15,35,45 can then be wrapped about the matrix and at least one respective jacket 16,36,46 applied thereover. Extensions 48 and slits 48a can be formed with a suitably shaped die orifice. Jacket 36 will include the step of installing at least one optical transmission component 37 therein.

Operation

An illustrative transmission component access procedure includes separation of the matrix from the optical transmission components and electrical conductor by accessing the fibers with ripcord 14 and/or a stripping tool, for example, stripping tool 20 (FIG. 3). Stripping tool 20 preferably includes jaws 21 having respective cutting edges 22,24,25 for cutting the matrix and receiving a central conductor and optical components. The optical transmission components can be connectorized to optical equipment or hardware, and the electrical conductors can be terminated with electrical connectors or equipment. During cable bending, some relative movement may be experienced between a loosely coupled optical transmission component and its respective matrix. In addition, if the cable of the present invention comprises a preferential bend characteristic, an optical transmission component aligned with the neutral axis thereof should experience low changes in optical attenuation.

The present invention has been described with reference to the foregoing exemplary embodiments, which embodiments are intended to be illustrative of the present inventive concepts rather than limiting. Persons of ordinary skill in the art will appreciate that variations and modifications of the foregoing embodiments may be made without departing from the scope of the appended claims. The concepts described herein can be applied to many cable designs, for example, self-supporting, buried, indoor, and indoor/outdoor cable applications. Flame retardant jacket materials can be selected to achieve plenum, riser, or LSZH flame ratings. Super absorbent polymers or blocking substances, e.g., thixotropic greases may be included in any interstice of a cable. Cables according to the present invention can include at least one additional electrical conductor for power or data transmission, for example, at least one twisted pair of wires.

Accordingly, what is claimed is:

1. A composite cable operative to transmit information in electrical and optical transmission modes, said cable comprising:
    an electrical coaxial conductor comprising an electrical conductor separated from a generally annular electrical conductor by a dielectric matrix; and
    at least one optical transmission component integrated with said matrix, said optical transmission component being generally surrounded by a buffering component, said buffering component defining a buffer zone that supports relative movement of said optical transmission component with respect to said matrix during cable bending.

2. The composite cable of claim 1, at least a portion of said matrix being interposed between said central conductor and said optical transmission component.

3. The composite cable of claim 1, said optical transmission component being disposed in a generally surrounding passageway loosely coupling said optical transmission component to said matrix.

4. The composite cable of claim 1, said optical transmission component comprising a 500–900 $\mu$m tight buffer layer.

5. The composite cable of claim 1, said cable including an outer cable jacket.

6. The composite cable of claim 5, said outer cable jacket comprising at least one optical transmission component disposed therein.

7. The composite cable of claim 5, said outer cable jacket comprising at least two stiffening members imparting preferential bend and neutral axis characteristics to said composite cable.

8. The composite cable of claim 7, wherein said optical transmission component is generally aligned with said neutral axis.

9. The composite cable of claim 1, said matrix comprising at least one ripcord therein.

10. The composite cable of claim 1, said matrix comprising at least one indicia generally aligned with said optical transmission component.

11. A composite cable operative to transmit information in electrical and optical transmission modes, said cable comprising:
    an electrical coaxial conductor comprising an electrical conductor separated from a generally annular electrical conductor by a dielectric matrix; and
    at least one optical transmission component associated with said matrix, said cable comprising stiffening members imparting a preferential bend characteristic and neutral axis thereto, said
    at least one optical transmission component being generally aligned with said neutral axis and being generally surrounded by a buffering component, said buffering component defining a buffer zone that supports relative movement of said optical transmission component with respect to said matrix during cable bending.

12. The composite cable of claim 11, at least one of said stiffening members comprising an extension formed in a cable jacket of said composite cable that surrounds said generally annular electrical conductor.

13. The composite cable of claim 11, at least one of said stiffening members comprising an opening formed therein.

14. The composite cable of claim 11, at least one of said stiffening members comprising a strength member.

15. The composite cable of claim 11, comprising at least two optical transmission components being generally aligned with said neutral axis.

16. A composite cable operative to transmit information in electrical and optical transmission modes, said cable comprising:
    an electrical coaxial conductor comprising an electrical conductor separated from a generally annular electrical conductor by a dielectric matrix; and
    at least one optical transmission component integrated with said matrix, said optical transmission component being adhered to said matrix with a controlled bond layer, said controlled bond layer selected from the group consisting of an interfacial layer of a relatively low modulus plastic, epoxy resin, and a tight buffer layer.

17. A composite cable operative to transmit information in electrical and optical transmission modes, said cable comprising:
    an electrical coaxial conductor comprising an electrical conductor separated from a generally annular electrical conductor by a dielectric matrix; and
    at least one optical transmission component integrated with said matrix, a ripcord being disposed in said matrix between said electrical conductors and being associated with said optical transmission component.

* * * * *